United States Patent
Olson et al.

(10) Patent No.: US 9,005,434 B2
(45) Date of Patent: Apr. 14, 2015

(54) WATER FILTER

(75) Inventors: Scott Olson, Mandan, ND (US); Robert A. Anderson, Ashby, MN (US)

(73) Assignee: Cedar Creek Filters, LLLP, Reeder, ND (US)

( * ) Notice: Subject to any disclaimer, the term of this patent is extended or adjusted under 35 U.S.C. 154(b) by 764 days.

(21) Appl. No.: 13/283,283

(22) Filed: Oct. 27, 2011

(65) Prior Publication Data

US 2013/0105414 A1    May 2, 2013

(51) Int. Cl.
*B01D 21/00* (2006.01)
*B01D 21/26* (2006.01)
*B01D 29/90* (2006.01)
*B01D 35/14* (2006.01)
*B01D 35/30* (2006.01)
*B01D 21/24* (2006.01)

(52) U.S. Cl.
CPC ............... *B01D 21/26* (2013.01); *B01D 35/14* (2013.01); *B01D 35/30* (2013.01); *B01D 29/908* (2013.01); *B01D 21/0012* (2013.01); *B01D 21/0087* (2013.01); *B01D 21/2405* (2013.01); *B01D 21/267* (2013.01); *B01D 2201/309* (2013.01)

(58) Field of Classification Search
USPC .............. 210/94, 295, 304, 308, 315, 497.01
See application file for complete search history.

(56) References Cited

U.S. PATENT DOCUMENTS

| 4,021,339 A | 5/1977 | Foody |
| 4,282,105 A | 8/1981 | Crowe |
| 5,811,002 A * | 9/1998 | Felber ........................... 210/315 |
| 2009/0127288 A1 | 5/2009 | Keller |

FOREIGN PATENT DOCUMENTS

| WO | 2012/122646 A1 | 9/2012 |
| WO | WO 2014142811 A1 * | 9/2014 |

OTHER PUBLICATIONS

International Search Report of PCT/US13/30523 dated May 22, 2013.
Written Opinion of PCT/US13/30523 dated May 22, 2013.

* cited by examiner

*Primary Examiner* — David A Reifsnyder
(74) *Attorney, Agent, or Firm* — Amster, Rothstein & Ebenstien LLP

(57) ABSTRACT

A water filter including a housing, at least one cylindrical filter component disposed within the housing, an inflow pipe extending through, and parallel to a longitudinal axis of, the at least one cylindrical filter component, the inflow pipe including a series of openings arranged along the length of the inflow pipe so as to cause a cyclonic motion of the contaminated water out of the inflow pipe and into contact with the at least one cylindrical filter component, a first outflow pipe that delivers filtered water from the at least one cylindrical filter component, and a second outflow pipe that delivers contaminants from the at least one cylindrical filter component.

13 Claims, 4 Drawing Sheets

WATER FILTER

TECHNICAL FIELD

The present invention is directed to the filtering of contaminated water generated during industrial processes such as oil drilling.

BACKGROUND

During an oil drilling process, debris (comprised of water, oil, stone, soil, metal fragments, mud and other components) is generated and stored in a pond adjacent to the drilling rig as sludge. This sludge must be treated according to industry standards set for maximum contaminant levels. These concerns stem from the potential adverse health effects of the contaminated water reentering the aquifer. The contaminated water, which is removed, must be trucked to disposal areas and pumped below the aquifer into detention areas, which are then sealed. Contaminated water removal has conventionally been a slow process, as the contaminants must be removed before transport. The only method currently available for removing contaminants from the water uses a sock type filter. This method is slow and cumbersome and requires many changes of the filter, causing serious time delays when filling the transport trucks.

While other types of water filters are available in different industries, the sock method is the only technique which has been acceptable to date for the filtering of contaminants from drilling sites. However, as mentioned previously, frequent filter changes are required, substantially slowing the transport process. Further, following scheduled filter replacements is crucial to eliminate the possibility of contamination, but not knowing the volume of sludge in the water does not allow for regular filter replacements. Thus, the operator must wait until the filter clogs, before replacing the filter. This slows the filtering process, substantially increasing the waiting time and operating costs.

One of the key difficulties faced in using the sock method is the complexity of the contaminated water. The water may contain particles of varying sizes, oil and tar. Filter life is dependent on how much of these components are present in the contaminated water and there is no easy way to segregate out the most damaging components to improve filter life.

SUMMARY OF THE INVENTION

The present invention is directed to an improved water filter that operates continuously with minimal energy requirements and is more effective in the removal of sludge and other pollutants from contaminated water sources.

A water filter according to an exemplary embodiment of the present invention comprises: a housing; at least one cylindrical filter component disposed within the housing; an inflow pipe extending through, and parallel to a longitudinal axis of, the at least one cylindrical filter component, the inflow pipe comprising a series of openings arranged along the length of the inflow pipe so as to cause a cyclonic motion of the contaminated water out of the inflow pipe and into contact with the at least one cylindrical filter component; a first outflow pipe that delivers filtered water from the at least one cylindrical filter component; and a second outflow pipe that delivers contaminants from the at least one cylindrical filter component.

According to at least one exemplary embodiment, the at least one cylindrical filter component comprises a first cylindrical filter component disposed within a second cylindrical filter component.

According to at least one exemplary embodiment, the water filter further comprises a collection chamber that collects solid debris filtered from the contaminated water.

According to at least one exemplary embodiment, the water filter further comprising a pre-filter, and the pre-filter comprises: a hose comprising a distal end portion and a proximal end portion, the proximal end portion being connected to the inflow pipe; a vacuum inlet connect to the distal end portion of the hose; and a vacuum filter connected to the vacuum inlet that filters the contaminated water.

According to at least one exemplary embodiment, the water pressure at the first outflow pipe is between 0-5 psi when the water filter is in operation.

According to at least one exemplary embodiment, water pressure at the first outflow pipe is between 0-3 psi when the water filter is in operation.

According to at least one exemplary embodiment, the at least one cylindrical filter component is removable for replacement with another cylindrical filter component.

According to at least one exemplary embodiment, the inflow pipe comprises a viewing element.

According to at least one exemplary embodiment, the contaminated water comprises oil.

According to at least one exemplary embodiment, the contaminants in the second outflow pipe for passing contaminants comprise oil.

According to at least one exemplary embodiment, the water filter further comprises a third outflow pipe for delivering small debris particles from the at least one cylindrical filter component.

According to at least one exemplary embodiment, the series of openings arranged along the length of the inflow pipe further comprise louvers.

According to at least one exemplary embodiment, wherein the housing comprises a top portion, and the louvers are spaced from the top portion of the housing.

A method of filtering contaminated water according to an exemplary embodiment of the invention comprises the steps of: providing a water filter comprising: a housing; at least one cylindrical filter component disposed within the housing; and an inflow pipe extending through, and parallel to a longitudinal axis of, the at least one cylindrical filter component, the inflow pipe comprising a series of openings arranged along the length of the inflow pipe; and delivering the contaminated water through the inflow pipe so as to cause a cyclonic motion of the contaminated water out of the inflow pipe and into contact with the at least one cylindrical filter component.

According to at least one exemplary embodiment, the method further comprises the steps of: delivering filtered water from the at least one cylindrical filter component; and delivering contaminants from the at least one cylindrical filter component.

According to at least one exemplary embodiment, the step of delivering contaminants comprises delivering relatively light in weight contaminants to an upper portion of the housing and delivering relatively heavy in weight contaminants to a lower portion of the housing.

According to at least one exemplary embodiment, the relatively light in weight contaminants comprises oil.

According to at least one exemplary embodiment, the step of delivering contaminants comprises limiting speed of the cyclonic motion of the contaminated water According to at least one exemplary embodiment, the step of delivering contaminants comprises limiting speed of the cyclonic motion of the contaminated water out of an upper portion of the inflow pipe.

According to at least one exemplary embodiment, the method further comprises the steps of providing a pre-filter, the pre-filter comprising: a hose comprising a distal end portion and a proximal end portion, the proximal end portion being connected to the inflow pipe; a vacuum inlet connect to the distal end portion of the hose; and a vacuum filter connected to the vacuum inlet that filters the contaminated water.

BRIEF DESCRIPTION OF THE DRAWINGS

Various exemplary embodiments of this invention will be described in detail, with reference to the following figures, wherein.

DETAILED DESCRIPTION

Figure 1:
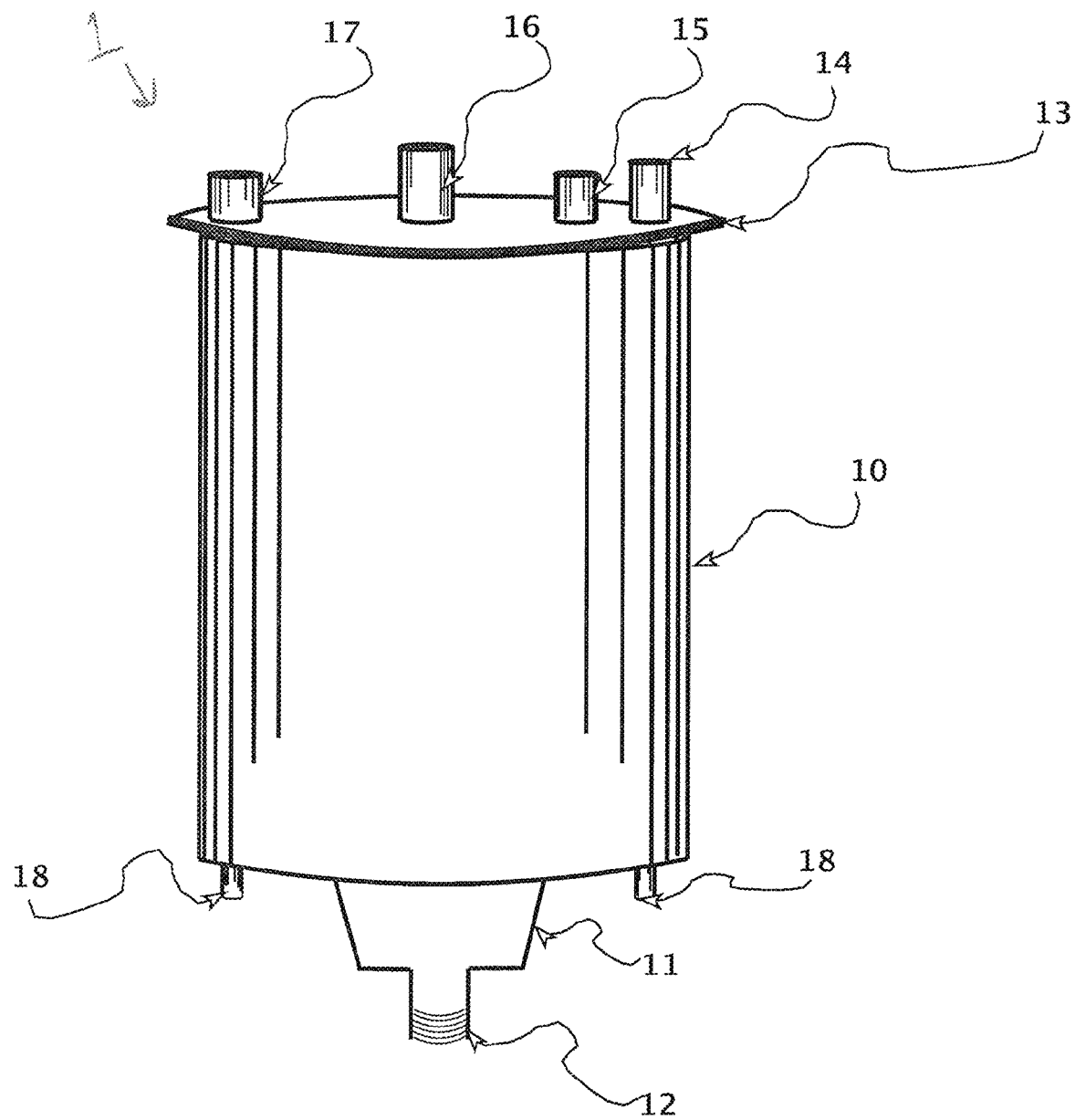
FIG. 1 is a perspective view of a water filter according to an exemplary embodiment of the present invention.
Figure 2:
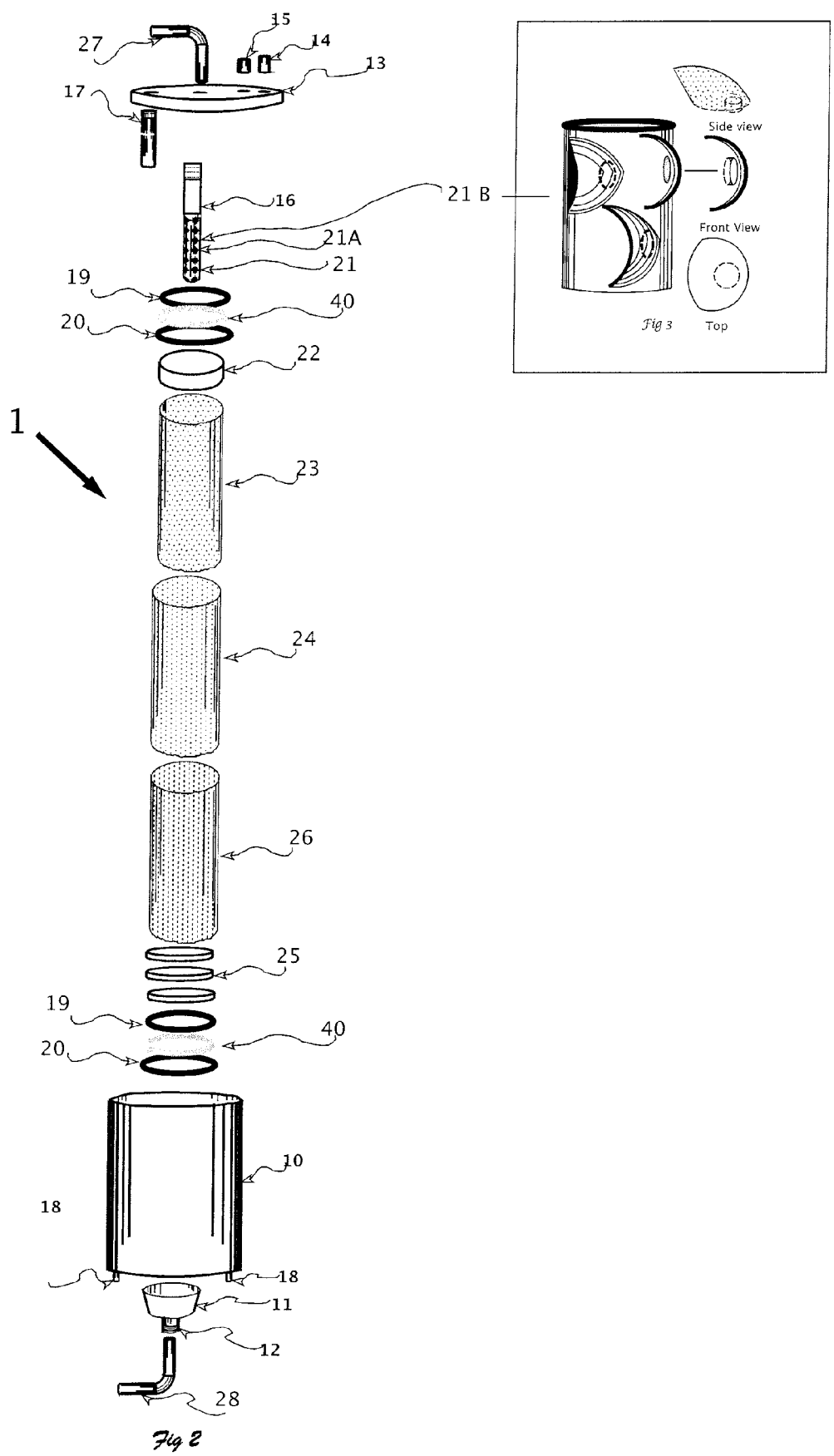
FIG. 2 is an exploded perspective view of the water filter of FIG. 1.
Figure 3:
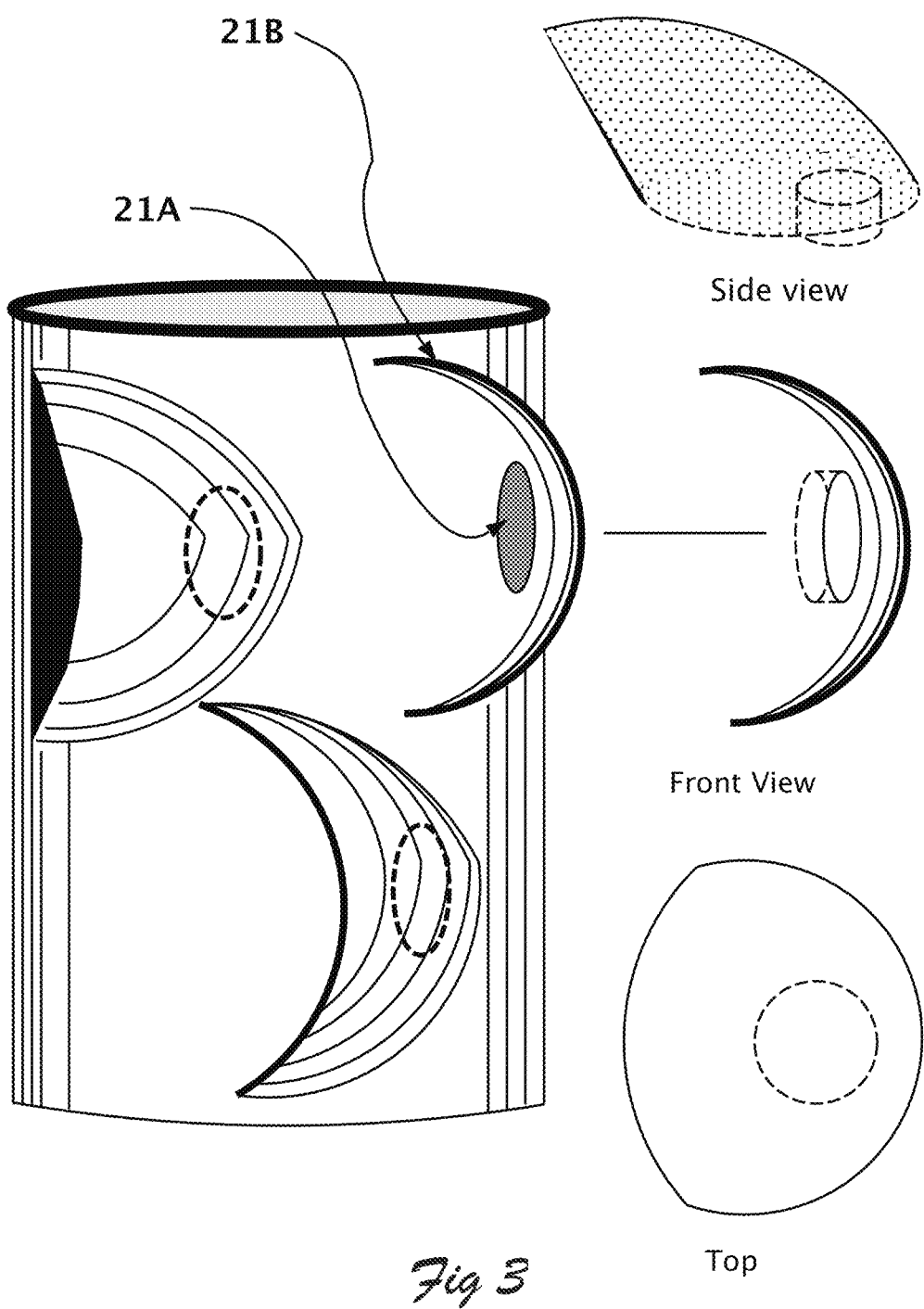
FIG. 3 is a perspective view of an inflow pipe useable with the water filter of FIG. 1 according to an exemplary embodiment of the present invention.

FIGS. 1 and 2 illustrate a water filter, generally designated by reference numeral 1, according to an exemplary embodiment of the present invention. Water filter 1 includes a housing 10, large piece debris basket 11, fitting 12, small, heavy particle outflow pipes 18 extending from the bottom of the housing 10, and a lid 13 with a retaining collar and seal that encloses the top of the housing 10. The size of the housing 10 may be selected according to the required capacity of the filter 1. An oil outflow pipe 14, a small, light particle outflow pipe 15, a main contaminated water inflow pipe 16 and discharge pipe 17 may pass through the lid 13. All of the pipes may have valves that control their rate of flow and which can be adjusted in order to control the operation of the filter 1. Discharge pipe 17 extends downwards into the perimeter of the housing 10 to draw filtered water out from below the floating oil and debris.

As described in more detail below, filter components are disposed within the housing 10. If there is too much inflow pressure due to an imbalance between the inflow and outflow of water relative to the filter components, small particles and oil may pass through the filter 1 and float to the top of the clean water area. The balance of pressures achieved through use of the various inflow and outflow pipes of the filter 1 substantially reduces passage of the particles and oil through the filter components.

According to an exemplary embodiment of the invention, the filter components disposed within the housing 10 may include a first filter component 23, a second filter component 24 and a third filter component 26. The filter components 23, 24, 26 may be cylindrical in shape and structured so as to progressively filter the contaminated water. The first filter component 23 may be, for example, 5/32"perforated 0.22" galvanized metal. A 6" high separator ring may be attached and sealed around the top of the first filter component 23 for containing oil within the contaminated water so that the oil does not pass through the filter 1. The separator ring may be, for example, 6" thick, although this thickness value is not intended to be limiting. The second filter 24 may be, for example, a 200-mesh, grade T316 stainless steel gauge 0.002" screen. In an exemplary embodiment of the invention, the housing 10 is designed such that the second filter 24 can be easily removed and replaced with other filters having different mesh sizes, such as, for example, 60 mesh to 800 mesh, so as to accommodate different sized debris. The third filter component 26 may be made of, for example, 16 gauge steel with 1/4" holes. The filter components 23, 24, 26 may be bound by bands 25 so that the filter components 23, 24, 26 do not bellow out or separate. The bands 25 may have a diameter of, for example, 24", and dimensions of, for example, 1/8"×1". Heavy, but small particles that are not collected in the debris basket 11 settle out to the edge of the bottom of the housing 10 on the clean water side and are discharged via pipes 18. The filter components 23, 24, 26 may be sealed in place with gaskets 40, each of which may be held between two metal rings 19, 20.

It should be clearly understood that the minimum size of the particles to be screened can be adjusted according to the mesh of the screen used in the second filter component 24. It should also be clearly understood that while water is the preferred aqueous solution, the filter system embodied herein can be used to filter other solutions and solids.

Figure 4:
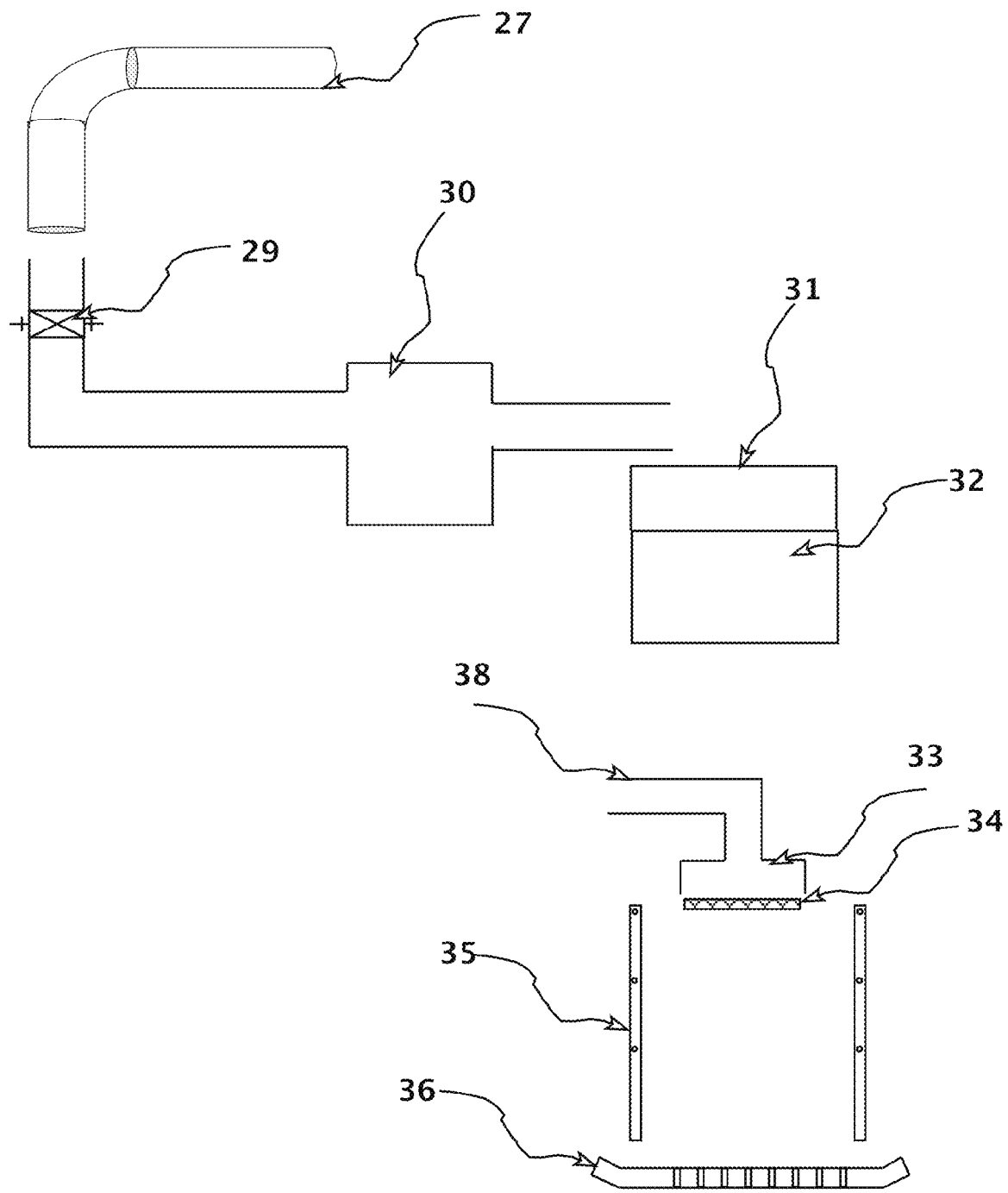
FIG. 4 is a diagram illustrating a process by which sludge is removed from a body of water according to an exemplary embodiment of the present invention.

As shown in FIG. 4, contaminated water may be suctioned from a pit through a hose using a pump 30. The pump may be rated at, for example, 0-25 psi. The flow rate may be adjusted to keep the filter pressure between 0-5 psi. As the pond drains, the level in the filter intake 33 lowers with the water level inside the filter 1 and requires more suction. To achieve this, the pump speed may be increased, preferably while the pressure at the discharge pipe 17 remains at 0-3 psi. The debris volume may be monitored through a viewing section 27, which may form a part of the contaminated water inflow pipe 16, located on the top of the lid 13. The viewing section 27 may be made of transparent material, such as, for example, glass or plastic. A flowmeter may be used to keep a volume count on the water inflow coming through the inflow pipe 16 for control purposes. As shown in FIG. 2, another debris viewing section may be attached and located at bottom cleanout 28. Adjustments may be made to the flow rates so that the bottom cleanout 28 does not get clogged with sand, mud or other debris.

In an exemplary embodiment of the invention, contaminated water inflow fills the inflow pipe 16 and is propelled from the inflow pipe 16 into a cyclonic motion with varying speeds at different levels of the inflow pipe 16. Specifically, the water exiting the central portion of the inflow pipe 16 may have the greatest rotational speed whereas the water exiting upper and lower portions may have lower speeds. The inflow pipe 16 may include, for example, a first section including a 4 inch wide steel, threaded, solid pipe section of 12 inch length and a second section 21 that is welded to the first section and which includes 15½ inch long, 14 gauge steel, rolled and welded into a tube with a closed bottom that has two alternating columns of holes 21A, the first column being of five units, the second column being of six units, all having angled louvers 21B and alternating around the circumference of the inflow pipe 16. The holes 21 may have a diameter of, for example, one inch has four rows of six holes 5 inches on center, to which the exit louvers 21B, are attached. These louvers 21B are about two and half inch cylinders, angular cut and welded around the hole. The louvers 21B are angled so as to direct the flow of water in a circular motion. The bottom of the pipe 16 is welded close to complete the assembly. The louvers 21B are positioned in a central location along the inflow pipe 16 and are not present near the ends of the pipe, thus effecting a greater rotational speed in the central portion of the inflow pipe 16.

The design embodied in this invention uses these separate layers to generate a circular flow within the filter 1 and to segregate the components of the contaminated water in conjunction with gravity. The holes 21A and the louvers 21B control the speeds and flow at the different levels. The separation of the different layers and the speed of the rotating water are important to the function of the gentle outflow through the filter screens. The oil layer and light debris will tend towards the upper portion of the filter where the rotational speed is reduced so as to exert minimal flow pressure, while heavier sand and large debris will tend downwards due to gravity. If the flow pressure is too great it can force the oil through the filter screens compromising the efficiency of the filter. The sandwiched filtration media restrains the larger particles of debris which are then collected at the large particle collector 12. Smaller particles are filtered and float to the top and exit through a small particle outflow pipe 15. The oil is removed through an oil outflow pipe 14.

As shown in FIG. 4, an exemplary embodiment of the present invention may include a pre-filter. The pre-filter prohibits large stones, debris, etc. from entering the filter 1. Additionally, the pre-filter provides the first separation of oil from entering the filter system. A hose from the inflow pipe 16 to the contaminated pond connects the pre-filter to the main filtering system. An air chamber 31 keeps the pre-filter floating on the surface of the oil and the water mixture. As the oil sometimes mixes with the water and sits below the main exposed oil level, an intake pipe 38 may extend through the air chamber 31 and spread out to a vacuum intake chamber 33. On the lower side of the vacuum intake chamber 33 is a large size opening with a mesh screening 34. The mesh screening 34 sits at the bottom of the vacuum. The vacuum intake chamber 33 and mesh screening 34 are located away from the bottom of the air chamber 31 so as to prevent oil floating on top of the water from entering into the vacuum intake chamber 33. Side baffles 32 may be used to contain the turbulence in the water that is created when the water is suctioned into the intake chamber 33, thereby inhibiting oil from mixing into the water. The entire assembly may be attached to support legs 35, which sit on a sled 36. The height of the sled 36 may be adjustable depending upon the type of material being suctioned from the ponds. The sled 36 may have holes drilled in the bottom to allow water to circulate up into the intake chamber 33. As the water level goes down, the sled 36 keeps the vacuum off of the sludge area at the base of the pond. The type and density of the sludge may be monitored through the sight glass 27 located just before the water enters the main filter 1. A valve 29 and pump 30, such as, for example, a 0-25 psi pump with a capacity of 0-400 gallons per minute, may be used to control the volume and flow of water.

An additional aspect of the present invention is the ability of the pump 30 to be reversed. This is particularly useful in situations when the contaminated water is relatively clean and has primarily small particles. Another advantage of being able to run the filter in reverse is to flush out the filter 1 and clear out any potential clogs.

The ability to run the filter 1 in reverse provides significant gain in efficiency in field use. An exemplary embodiment of the present invention using a combination of a pre-filter and main filter may generally achieve a pumping rate of about 100 to 350 gallons/minute of water during operation, depending on the degree of contamination. This is a rate comparable to a sock filter. However, whereas the present invention can fill up a truck of water in about 25-40 minutes at this pumping rate, the sock filter may be changed 1-3 times during the course of loading the truck, with each change taking about 10 minutes. Further, a tear in the sock or mishandled change can contaminate an entire truck. The filter of the present invention may be run constantly as it is self-cleaning, by adjusting the flow valves, thus keeping the filtration system in continuous operation.

In an exemplary embodiment of the invention, the entire filter assembly may sit on a trailer, which also contains the pumps and hoses connecting the filters. The floor of the trailer may have angular siding that prevents any potential spills from reaching the ground level.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A water filter comprising:
   a housing;
   at least one cylindrical filter component disposed within the housing;
   an inflow pipe extending through, and parallel to a longitudinal axis of, the at least one cylindrical filter component, the inflow pipe comprising a series of openings arranged along the length of the inflow pipe so as to cause a cyclonic motion of the contaminated water out of the inflow pipe and into contact with the at least one cylindrical filter component;
   a first outflow pipe that delivers filtered water from the at least one cylindrical filter component; and
   a second outflow pipe that delivers contaminants from the at least one cylindrical filter component.

2. The water filter of claim 1, wherein the at least one cylindrical filter component comprises a first cylindrical filter component disposed within a second cylindrical filter component.

3. The water filter of claim 1, further comprising a collection chamber that collects solid debris filtered from the contaminated water.

4. The water filter of claim 1 further comprising a pre-filter, the pre-filter comprising:
   a hose comprising a distal end portion and a proximal end portion, the proximal end portion being connected to the inflow pipe;
   a vacuum inlet connect to the distal end portion of the hose; and
   a vacuum filter connected to the vacuum inlet that filters the contaminated water.

5. The water filter of claim 1, wherein water pressure at the first outflow pipe is between 0-5 psi when the water filter is in operation.

6. The water filter of claim 5, wherein water pressure at the first outflow pipe is between 0-3 psi when the water filter is in operation.

7. The water filter of claim 1, wherein the at least one cylindrical filter component is removable for replacement with another cylindrical filter component.

8. The water filter of claim 1, wherein the inflow pipe comprises a viewing element.

9. The water filter of claim 1, wherein the contaminated water comprises oil.

10. The water filter of claim 1 wherein the contaminants in the second outflow pipe for passing contaminants comprise oil.

11. The water filter of claim 10, further comprising a third outflow pipe for delivering small debris particles from the at least one cylindrical filter component.

12. The water filter of claim 1 wherein said series of openings arranged along the length of the inflow pipe further comprise louvers.

13. The water filter of claim 12, wherein the housing comprises a top portion, and the louvers are spaced from the top portion of the housing.

* * * * *